(12) United States Patent
Eisenberg (10) Patent No.: US 7,908,322 B2
(45) Date of Patent: *Mar. 15, 2011

(54) INITIATION AND SUPPORT OF VIDEO CONFERENCING USING INSTANT MESSAGING

(75) Inventor: Alfred J. Eisenberg, Francestown, NH (US)

(73) Assignee: Radvision Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/581,985

(22) Filed: Oct. 20, 2009

(65) Prior Publication Data

US 2010/0066807 A1    Mar. 18, 2010

Related U.S. Application Data

(63) Continuation of application No. 10/007,129, filed on Dec. 3, 2001, now Pat. No. 7,631,039.

(60) Provisional application No. 60/250,695, filed on Dec. 1, 2000.

(51) Int. Cl.
*G06F 15/16* (2006.01)

(52) U.S. Cl. ....................................................... 709/204

(58) Field of Classification Search ................... 709/204
See application file for complete search history.

(56) References Cited

U.S. PATENT DOCUMENTS

| 5,710,591 | A  | * | 1/1998  | Bruno et al. ............... | 348/14.09 |
|-----------|----|---|---------|------------------------------|-----------|
| 5,784,561 | A  | * | 7/1998  | Bruno et al. .................. | 709/204   |
| 5,793,365 | A  | * | 8/1998  | Tang et al. ..................... | 715/758   |
| 5,867,494 | A  | * | 2/1999  | Krishnaswamy et al. ..... | 370/352   |
| 6,020,915 | A  | * | 2/2000  | Bruno et al. ............... | 348/14.09 |
| 6,288,739 | B1 | * | 9/2001  | Hales et al. ............... | 348/14.07 |
| 6,330,022 | B1 | * | 12/2001 | Seligmann ................. | 348/14.08 |
| 6,466,252 | B1 | * | 10/2002 | Miyazaki ..................... | 370/260   |
| 6,487,583 | B1 | * | 11/2002 | Harvey et al. ................ | 709/204   |
| 6,532,218 | B1 | * | 3/2003  | Shaffer et al. ................ | 370/260   |
| 6,564,261 | B1 | * | 5/2003  | Gudjonsson et al. ......... | 709/227   |
| 6,640,239 | B1 | * | 10/2003 | Gidwani ....................... | 709/203   |
| 6,678,719 | B1 | * | 1/2004  | Stimmel ....................... | 709/204   |
| 6,714,793 | B1 | * | 3/2004  | Carey et al. .................. | 455/466   |
| 6,747,970 | B1 | * | 6/2004  | Lamb et al. .................. | 370/352   |
| 7,031,268 | B1 | * | 4/2006  | Shaffer et al. ................ | 370/260   |
| 7,631,039 | B2 | * | 12/2009 | Eisenberg ..................... | 709/204   |
| 2002/0071540 | A1 | * | 6/2002 | Dworkin .................. | 379/202.01 |
| 2002/0076025 | A1 | * | 6/2002 | Liversidge et al. ...... | 379/202.01 |
| 2003/0208543 | A1 | * | 11/2003 | Enete et al. ................... | 709/206 |

* cited by examiner

*Primary Examiner* — Kamal B Divecha
(74) *Attorney, Agent, or Firm* — Byrne Poh LLP (57) ABSTRACT

A system and method for initiating and supporting network video conferences are disclosed. In accordance with the invention, one or more instant messaging enabled clients can initiate a video conference. At least a pair of client nodes communicate with each other via an instant messaging utility. An instant messaging server supports instant messages between the two client nodes. A second server, e.g., a video conferencing server, supports video conferences between video conference participants, a video conference being initiated between video conference participants in response to an instant message transmitted between the at least two client nodes.

12 Claims, 10 Drawing Sheets

IM Client Invites IM Client

Incoming h.32x Calls - Rev 0.6

FIG. 10

INITIATION AND SUPPORT OF VIDEO CONFERENCING USING INSTANT MESSAGING

RELATED APPLICATIONS

This application is a continuation of U.S. patent application Ser. No. 10/007,129, filed on Dec. 3, 2001, which claims the benefit of U.S. Provisional Patent Application No. 60/250,695, filed on Dec. 1, 2000, the contents of which are hereby incorporated by reference herein in their entireties.

BACKGROUND OF THE INVENTION

Video conferencing via networks such as the Internet is becoming increasingly popular. Video conferences on the Internet are typically supported by a video conferencing server such as the Multipoint Conference Unit (MCU), manufactured, sold and licensed by First Virtual Communications, Inc. of Nashua, N.H. and Santa Clara, Calif. Participants in a video conference supported by such servers communicate via their local video conferencing client software over the Internet with the MCU, which provides the audio and/or video conferencing data to some or all of the participants. Typically, video conferences are initiated by one or more prospective participants communicating with the MCU, such as by visiting a dedicated website, to identify invitees to the conference. The MCU then initiates and supports the video conference by providing the appropriate conference data to the client associated with each of the identified participants through network links with each of the clients.

Instant messaging (IM) is becoming an increasingly popular utility on networks such as the Internet. Under instant messaging, IM clients on a network can communicate with each other via an IM server or messenger service of the network. The messenger service also typically provides a "presence" feature which permits IM clients to know the status of other clients on the network serviced by the messenger service. The status information for a client includes whether the client is online and available to receive instant messages from other clients and whether the client presently at his workstation, which can be determined by the level of activity at the client's workstation. The presence feature also allows clients to declare themselves unavailable to receive instant messages so that incoming messages can be blocked.

Because of the wide range of capabilities and the convenience of instant messaging, it is becoming a popular means of communication among clients on networks. For example, individual companies are using instant messaging utilities as their preferred means of communication among employees.

SUMMARY OF THE INVENTION

The present invention is directed to a system and method for combining the convenience of instant messaging with video conferencing capability to allow a user to initiate a video conference using IM. The system of the invention includes at least two client nodes which are adapted to communicate with each other via an instant messaging utility. An instant messaging server supports instant messages between the two client nodes. A second server supports video conferences between video conference participants. In accordance with the invention, a video conference is initiated between video conference participants in response to an instant message transmitted between the at least two client nodes.

The video conference participants can participate in the video conference by any of several possible communication modes. For example, a participant may participate in a video conference via a desktop computer or dedicated video conferencing system using a video conferencing standard protocol such as H.323 video conferencing protocol. The participants may communicate via the public switched telephone network (PSTN), cellular communication, and ISDN protocol or an ATM protocol. Each participant may communicate via one or more internet IP gateways which form the interface between the internet and a particular participant's communication mode.

In one embodiment, the instant message contains information used to identify the communication mode to be used by a participant in the video conference. That is, an IM client with IM capability can initiate a video conference using the IM utility to identify participants in a video conference. A database used in connection with initiating video conferences indexes and catalogs communication and/or contact data for each participant in the identified video conference. This information is used to set up the video conference among the identified participants using each participant's preferred communication mode. These communication modes can be any of those identified above. In one embodiment, another server is used to coordinate the video conference among the participants identified by the instant message. This third server, in conjunction with the database, contains all of the communication mode information mentioned above and tabulates the communication mode information with participants in each initiated video conference. This third server can receive communication mode information from the instant message used to initiate the video conference. The information can then be used by the third server to set up the video conference using the appropriate communication modes associated with the identified participants.

Hence, in accordance with the invention, the increasingly popular instant messaging utility implemented by many internet service providers (ISP) such as AOL, MSN, etc. can be used to automatically initiate a video conference. This can be a significant convenience to business and personal users compared to conventional systems in which one may have to visit a dedicated website to initiate a video conference.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
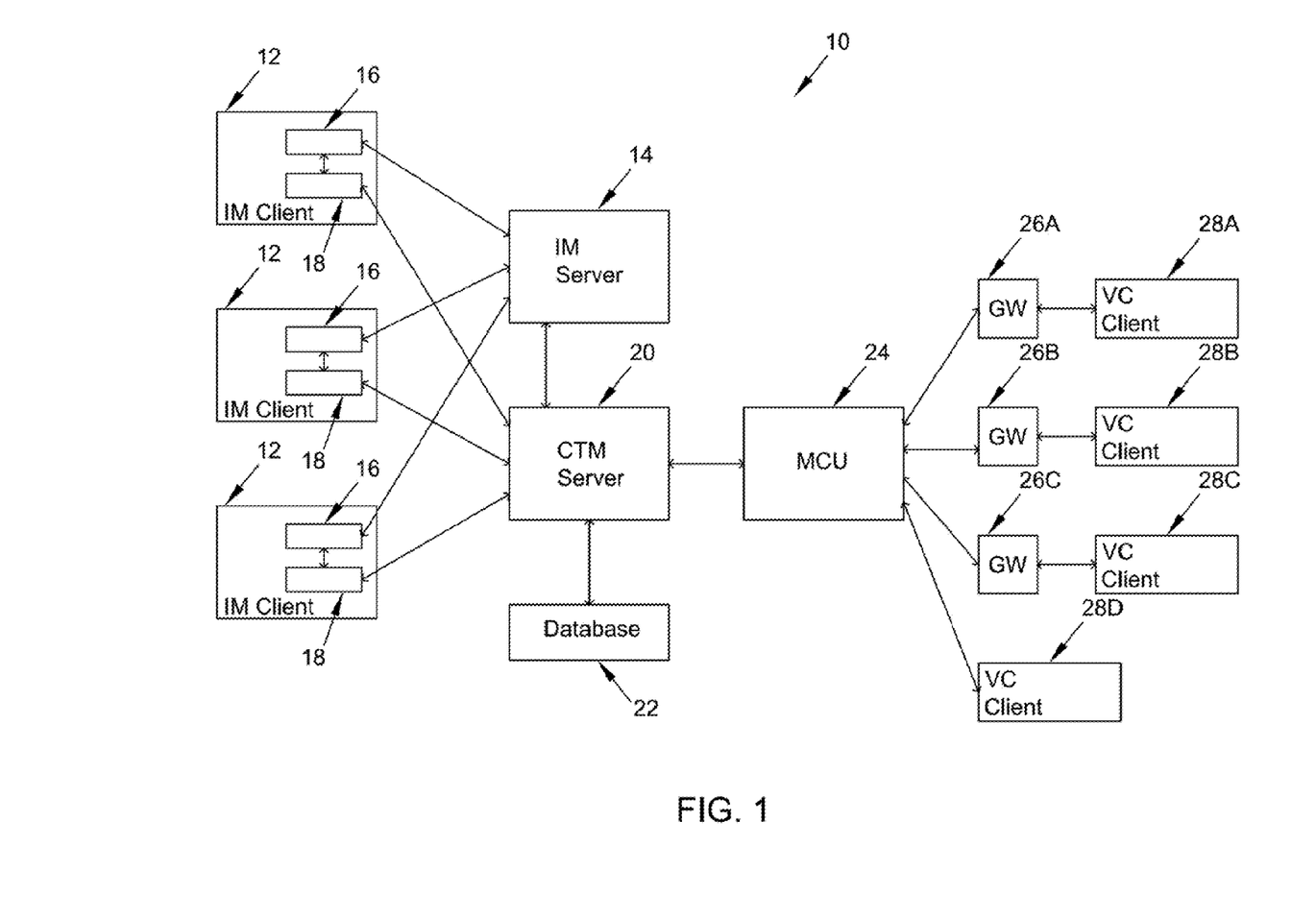
FIG. 1 contains a schematic block diagram illustrating one embodiment of the system of the invention in which an instant messaging utility is used to initiate and support a video conference.

FIG. 1 contains a schematic block diagram illustrating one embodiment of the system 10 of the invention in which an instant messaging utility is used to initiate and support a video conference. The system 10 is implemented over a network such as the Internet, and communication among the system components is via network protocol such as the Internet Protocol (IP) indicated by the solid lines with arrowheads in FIG. 1.

The system includes a number of clients 12 which are capable of communicating over the network by some conventional instant messaging (IM) utility. Each client 12 can be, for example, a computer adapted to communicate over the Internet. Each of the clients 12 includes an IM client software module 16 which permits the client 12 to send and receive instant messages. Each of the IM client modules 16 can create, transmit and receive instant messages. The IM utility is supported by a messenger service or IM server 14 on the network. An IM client 12/16 creates an instant message and forwards the message to the IM server 14. The IM server 14 analyzes the message and forwards it to its intended recipient IM client 12/16.

In accordance with the invention, the system 10 also provides the capability to perform video conferencing over the network, i.e., Internet. Video conferences among video conferencing (VC) clients 28 are initiated and supported by a video conferencing server 24, also referred to herein as a multipoint conferencing unit (MCU). The MCU can be of the type manufactured, sold and licensed by First Virtual Communications, Inc. of Nashua, N.H. and Santa Clara, Calif., the assignee of the present patent application. When a video conference is in session, the MCU 24 enables and manages the conference. The MCU 24 formats audio and video data from the clients 28 and sends the audio and/or video data to the clients 28 as participants in the conference. The MCU can receive and transmit the video conference data to and from the clients 28 using some standard video conferencing protocol, for example, H.323 protocol, T.120 protocol, session initiation protocol (SIP) or CUseeMe protocol provided by First Virtual Communications, Inc., the present assignee.

As illustrated in FIG. 1, in general, the MCU 24 can support video conferences with VC clients 28 communicating by various means. For example, VC clients 28 can participate in a conference via the public switched telephone network (PSTN), or via an ISDN H.320 standard protocol, or an ATM H.321 standard protocol, or a cellular communication protocol, etc. To support each of these means of communication, the MCU 24 interfaces with such clients via a gateway 26 which provides an interface which translates between the protocol used by the VC client 28 participating in the video conference and the MCU 24 supporting the video conference. Also, the VC client 28D can communicate directly with the MCU 24 in a video conferencing protocol, eliminating the need for a gateway 26.

Conventionally, video conferences are initiated on the MCU 24 by one of the VC clients identifying the "invitees" or participants in a video conference such as by visiting a web page supported by the MCU 24. In response, the MCU 24 contacts each of the participants and sets up communication links with them or their associated gateways using a video conferencing protocol. When the conference begins, the MCU 24 transmits and receives conferencing data to and from the participating clients. The conference can be initiated using a server, referred to herein as a "click-to-meet" CTM server 20, which supports the web page at which the video conference is initiated by one of the VC clients identifying the participants. The CTM server 20 interfaces with a database 22 which stores the identities and contact information for all potential participants in a conference. The database 22 also stores the communication modes used by each participant. When the participants are identified, the server 20 uses the database 22 to set up the video conference using the communication modes for all of the identified participants.

In accordance with the invention, video conferences are initiated using the instant messaging utility. To that end, each IM client 12 includes a video conference module 18 which interfaces with both the IM client module 16 and the CTM server 20 to initiate a video conference. In accordance with the invention, the IM utility on each client 12 is modified to permit a client to identify invitees to a conference. These invitees can be, for example, taken from a buddy list supported by the I'M utility. In one embodiment, a user at an IM client 12 can set up a video conference by clicking on one or more buddies in a buddy list provided by the IM utility.

The IM client module 16 and the video conference module 18 within each client 12 are interface to each other. When an instant message setting up a video conference is sent by a client 12 via its IM client module 16, the video conference module 18 detects the message. It extracts information from the message which is used to set up the video conference automatically through the CTM server 20. The information extracted from the IM can include the identity, address and communication mode for each prospective participant in the conference. Once the CTM server 20 receives this information, it can initiate the conference via the MCU 24. Alternatively, the information extracted from the instant message can include the identity of the prospective participants in the video conference. This identity information is provided to the CTM server 20 which can associate each participant with its address, communication mode, gateway address, and other required information, using the database 22. This information is used in setting up the video conference in the MCU 24.

FIG. 1 is a generalized block diagram which illustrates the general case of the invention, namely, one or more IM clients 12 being capable of automatically initiating a video conference among one or more video conferencing clients 28 using an IM utility. It will be understood, however, that in one likely configuration of the invention, the IM clients 12 are the same as the VC clients 28. For example, each IM client 12 can be a user's computer adapted to communicate on the Internet. The computer can have the IM client module 16 and the video conferencing client 18 installed. Also, the computer can include the video conferencing client module as well. In this configuration, the user can decide to initiate a video conference on his own computer. He can use his instant messaging facility to invite other participants. In response, the CTM server 20 and MCU 24 can initiate the video conference on the inviter's computer and with the other invited participants.

In general, the instant-message-initiated video conferencing capability of the invention is implemented in modules at the individual clients. For example, the clients 12 which initiate the conference via instant messages include both IM modules 16 responsible for sending and receiving instant messages and video conference initiation modules 18 which extract data from the instant messages to initiate the conferences, in accordance with the foregoing description. The video conferencing clients 28 include the actual video conferencing client modules which interface with the MCU 24 to present the video conference to the users at the clients 28. To participate in a video conference, the client 28 must have the video conference module installed. In the event that an invitee to a conference does not have the module installed, the client 28 is automatically directed to an installation center which provides the necessary modules in plug-in form via the Internet.

In accordance with the invention, the CTM server 20, in conjunction with the database 22, maintains the capability to initiate video conferences with the various VC clients 28. As noted above, the database 22 and CTM server 20 maintain information as to the modes of communication, e.g., telephone, cellular, etc., used by each client 28 such that, when a video conference is initiate, each client 28 can be contacted and connected to the conference by the correct communication mode. In accordance with the invention, the CTM server 20 also provides an additional capability in that it "advertises" or makes information available as to presence of the clients 28. That is, analogous to the method by which an instant messaging system advertises presence of individual IM clients on the network, the CTM server 20 in accordance with the invention advertises presence of individual VC clients 28. As noted above, these VC clients 28 may be colocated with corresponding IM clients 12, such as the case where a user's desktop computer contains an IM client software module 16, a video conference initiation software module 18 and a video conferencing client software module 28. As an example of the CTM server's capability to advertise presence of VC clients 28, the CTM server 20 may advertise that a particular client 28 is available to receive a cellular communication. Also, the CTM server 20 and database 22 may be set up, for example, to indicate a client 28 as being reachable by cellular communication when the clients' IM presence indicates that he is away from his computer. This presence feature is implemented via a link between the CTM server 20 and the IM server 14. As a result, IM clients 12 can know whether and by what means of communication particular clients 28 are available for conferencing.

In accordance with an embodiment of the invention, there are generally three methods of initiating a video conference. The messaging in each case is basically the same and is in accordance with the following description, but the endpoints, i.e., VC clients 28, may either call on to the conference or be invited into the conference. Any conference can be made up of either of these caller/callee types.

The first initiation method is referred to as desktop initiation. Instant messaging is used via menu choice, added buttons or other means of selection to identify participants. The caller initiates invitation through IM and launches either a local application (such as Microsoft NetMeeting or CUseeMe client software provided by First Virtual Communications, Inc., the present assignee), a web page with a plugin (such as CUseeMe Web plugin provided by First Virtual Communications, Inc.) or its own embedded audio/video technology, or is called on its local computer or separate device, e.g., telephone, dedicated room video conferencing system, etc.

The second method involves IM presence advertised by the CTM server 20. Presence of devices such as room systems, cellular phones, etc., is advertised by the CTM server on behalf of users available at cell phones, room systems, etc. In this case, instant messages may not be exchanged with the actual device used to participate in the conference.

In the third method, presence is advertised for an existing conference. For example, the existing conference, such as a regularly scheduled company meeting, is listed on an IM client 12 as a "Buddy." The client 12 can join the conference simply by clicking on the buddy icon for the conference.

The following describes the modules at the clients used to initiate and support video conferences using the instant messaging utility, in accordance with the invention.

1. Components

The components of the system of the invention which implements audio/video enhanced instant messaging and video conferencing initiated using the instant messaging system will now be described.

1.1 Desktop Client

The desktop client has a user interface similar to that of a traditional instant messaging client such as MSN and iPulse. It has the standard instant messaging features of contact list and its management functions such as add/remove group/contact, and an icon in the Windows taskbar tray. In one embodiment, audio and video conferencing is integrated into the instant message and group conference scenarios for up to 4 participants. Once in a group conference, the creator of a conference may invite additional participants.

1.1.1 Partner/OEM Friendly User Interface (UI)

The UI is adaptable to being provided as a component to an original equipment manufacturer (OEM) because it provides the customizations listed below. The implementation of these items provides the following features:

A. Pluggable Resources (Graphics)—The ability to easily at least partially change the "skin" of the application, with OEM specific graphics.

B. Ad Space (Standard) in client—Ad space is provided in industry standard format similar to AIM, with click-through support.

C. URL launched Web based Conference Pages—All text and A/V enhanced conferences can be launched in web pages instead of the typical application windows. Sample templates are provided for OEMs to add their own graphics. A default page is provided by if the OEM partner does not supply one.

1.1.2. Installation

The application has a standard installer such as a standard Windows installer.

1.2. IM Call Router

The back end component bridges the IM and A/V conferencing environments and controls management of connections in the A/V enhanced IM system. It is designed to support any IM system a well as any video conferencing protocol. The capabilities of the IM Call Router include the following.

A. Handle requests for calls from A/V enabled IM endpoints to other A/V enabled IM endpoints.

B. Handle incoming calls from videoconferencing environments such as session initiation protocol (SIP) and H.323, and map these requests to specific IM users.

C. Handle outgoing calls from A/V enabled IM clients to the same videoconferencing endpoints as item B.

D. Request A/V conferences and redirect the callers and callees to the appropriate conference.

The IM Call Router has the following components.

A. IM Plugin—Responsible for all communication with LM clients through the IM server.
B. Conference Allocator Plugin—Responsible for all communication between the IM router and the conference allocator.
C. Call Redirector Plugin—This component handles incoming and outgoing calls from/to other network protocols such as SIP and H.323 and is responsible for all communication between the IM Call Router and the non-IM endpoints.

Further details of the IM Call Router are described below.

1.3. Smart Conference Allocator

The smart conference allocator is responsible for creating conferences in an application service provider (ASP) video conferencing environment. The ASP environment in accordance with the invention can be of the type described in copending U.S. patent application Ser. No. 09/735,828, filed on Dec. 13, 2000, entitled, "Application Service Provider Configuration and Method for a Conferencing Environment," assigned to First Virtual Communications, Inc., the assignee of the present application. The contents of that application are incorporated herein in their entirety.

The ASP in this application also refers to a system configuration in which the system is installed into an enterprise which then deploys services only to its employees. This configuration is referred to herein as an enterprise internal deployment.

2. A/V Enhanced Instant Messaging Scenarios

There are two scenarios that are addressed in accordance with the invention. The two scenarios include IM users inviting other IM users to participate in a video conference and H.320 standard protocol users calling IM users. For either scenario, the following items are provided in accordance with the invention.

A. An intelligent server side component (IM Call Router) to handle conferencing requests on behalf of IM clients and/or the Intelligent H.323 call router.
B. ASP components for dispatching incoming calls, dispatching and allocating conferences, and notifying the IM Call Router of certain events.
C. An additional channel between the IM clients, through the IM server to the IM Call Router to communicate A/V conference requests and information.

For all scenarios in this section, there are no client side APIs needed on the client side other than, for example, a CUseeMe Web software development kit (SDK) sold by First Virtual Communications, Inc. of Nashua, N.H. and Santa Clara, Calif. and the additional IM channels for communication between IM component. The intelligence for finding conferences and other users stays on the server side and is implemented in the IM Call Router.

The following sections describe the scenarios and components.

2.1 IM user INVITES IM User(s)

Figure 2:
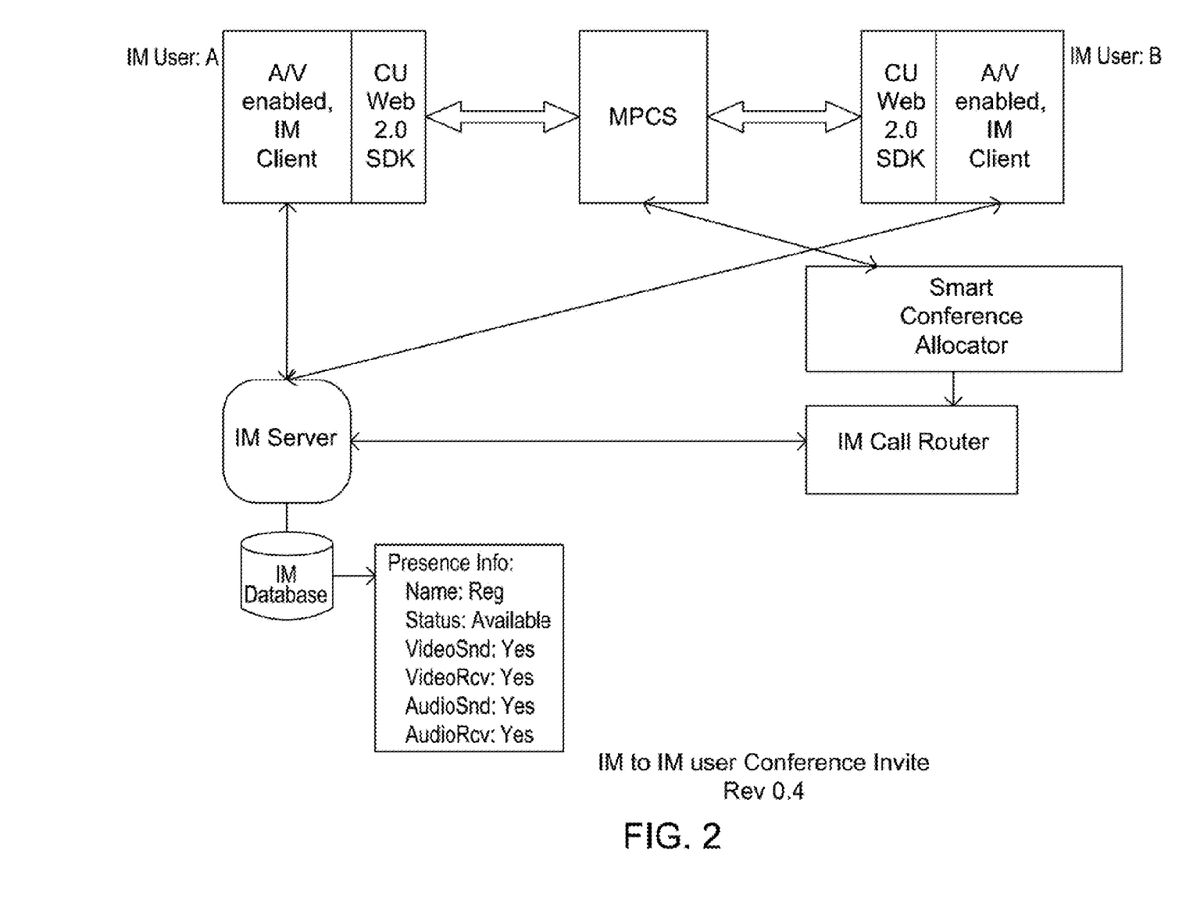
FIGS. 2 and 3 are functional block diagrams and protocol diagrams, respectively, of initiation of a video conference in which a first instant messaging client invites a second instant messaging client to participate in the conference, in accordance with one embodiment of the invention.
Figure 3:
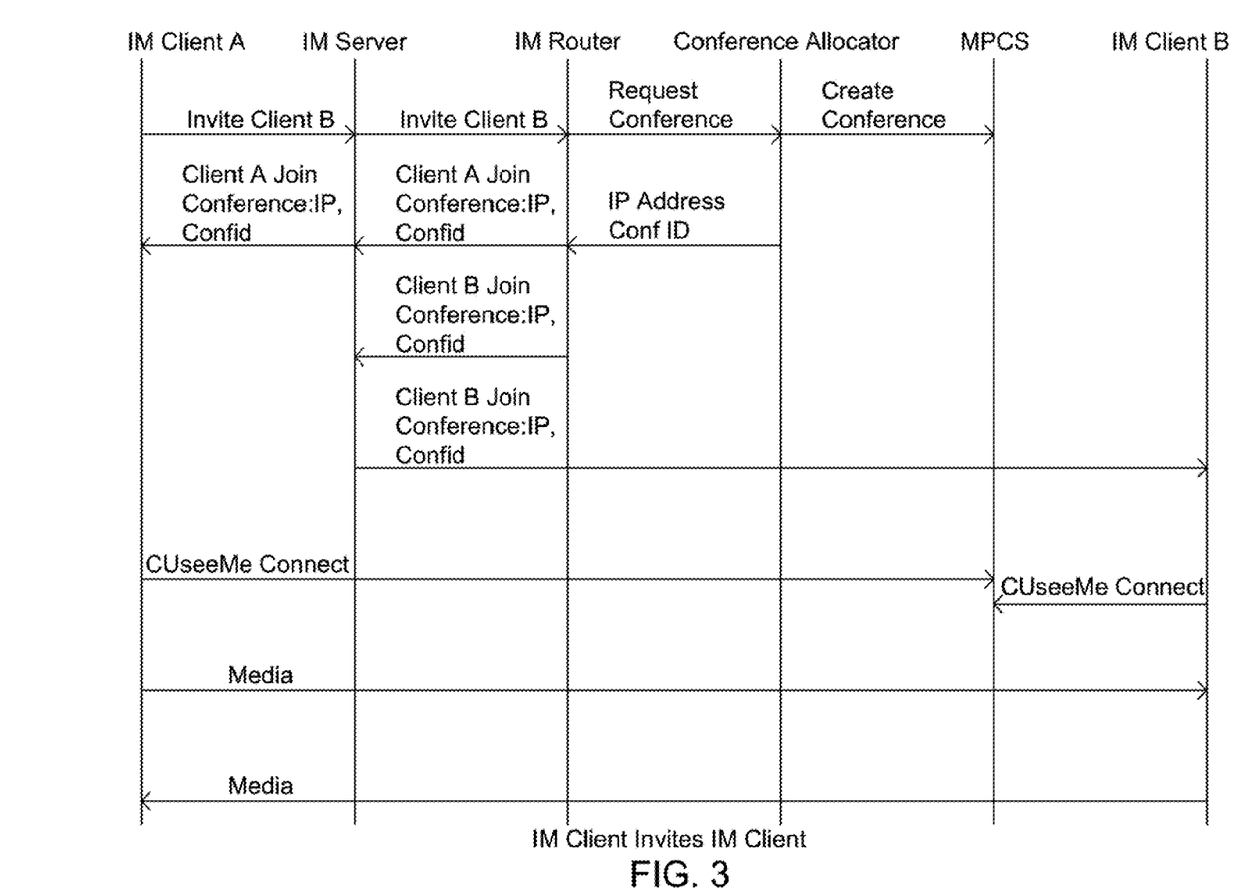

When one IM user invites another IM user into an A/V conference, a private communications channel is opened through the IM Server to the IM Call Router. The IM Call Router initiates a conference via the conference allocator, with the appropriate attributes determined by the capabilities of endpoints (determined from Presence info and IM DB Properties). Once the conference information (IP, conference ID, potentially other conference attributes) is determined, the conference dispatcher initiates the location and invitation of the user through IM Call Router. Eventually the IM Call Router will get the conference information to the invitee(s) of which conference to connect to, and the connection will be initiated by the client through the CUseeMe Web SDK. FIGS. 2 and 3 are component and protocol diagrams of this process.

2.2 Incoming H.32x Calls to IM Users

In addition to IM users calling/conferencing with other IM users, an infrastructure for incoming and outgoing calls with h.32x systems is supported through the ASP and IM System.

ASP components help map incoming h.32x calls to IM users, check their availability and through the IM system get them to meet the incoming caller in a conference allocated for an H.32x port. The mapping is done by additional destination h.32x alias information added to the initial call destination address to additional properties on user records in the IM database (i.e. E164 alias, H323 ID).

Figure 4:
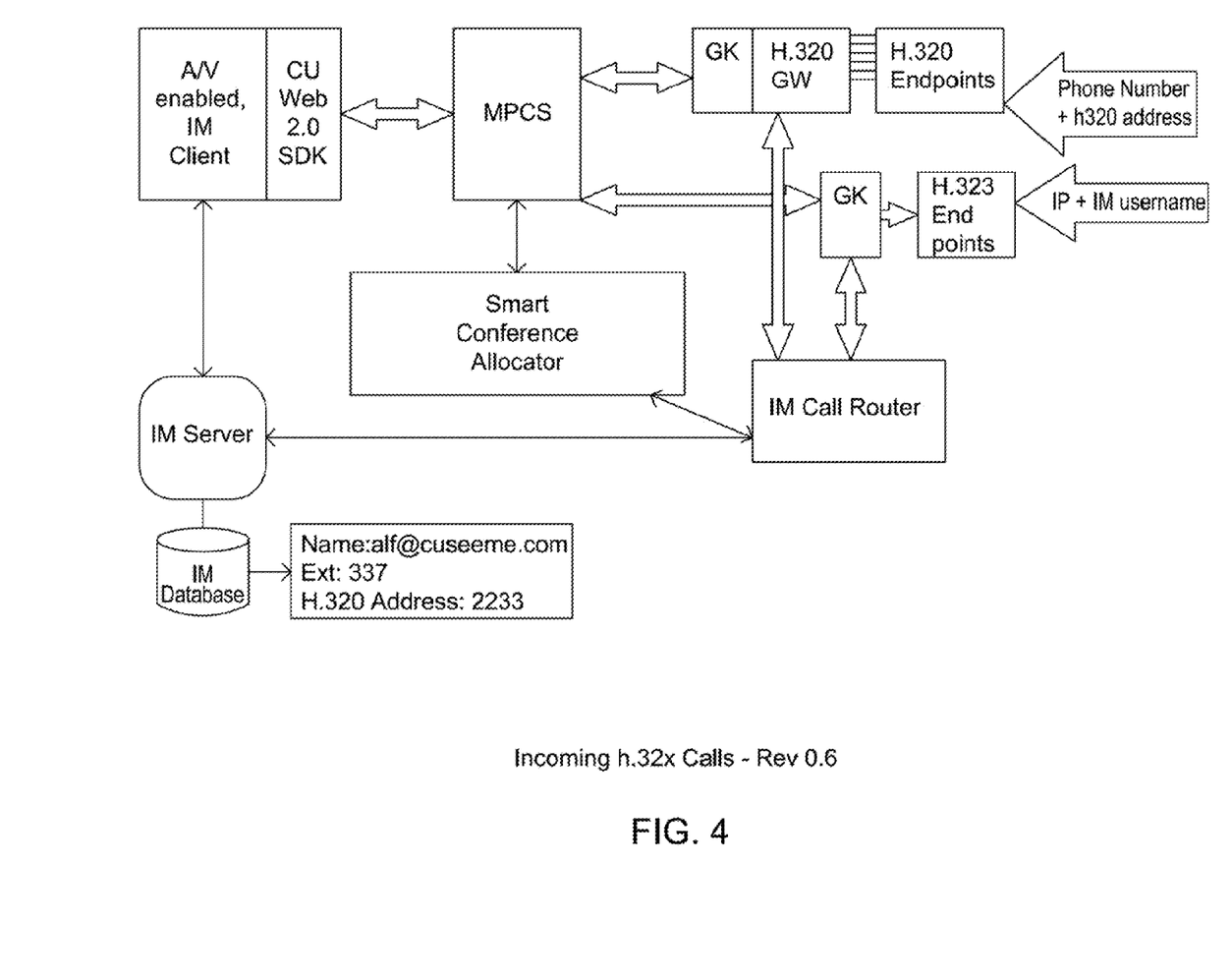
FIGS. 4 and 5 are functional block diagrams and protocol diagrams, respectively, of initiation of a video conference in which a first client initiates the conference via a H.32x communication to an instant messaging client, in accordance with one embodiment of the invention.
Figure 5:
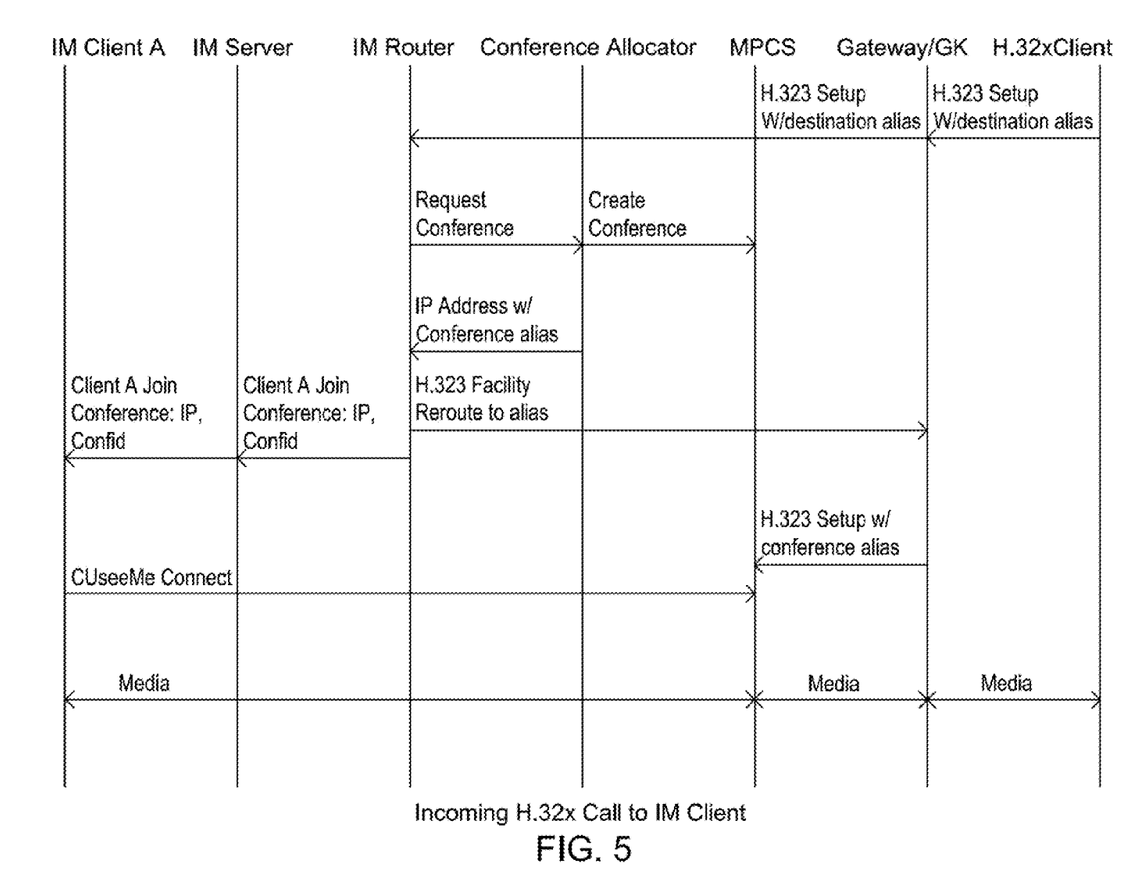

FIGS. 4 and 5 illustrate the components and protocol necessary to satisfy supporting incoming h.320 calls to IM users, with the added bonus of calls from other h.323 endpoints.

2.3 Outgoing Calls to H.32x Users

Figure 6:
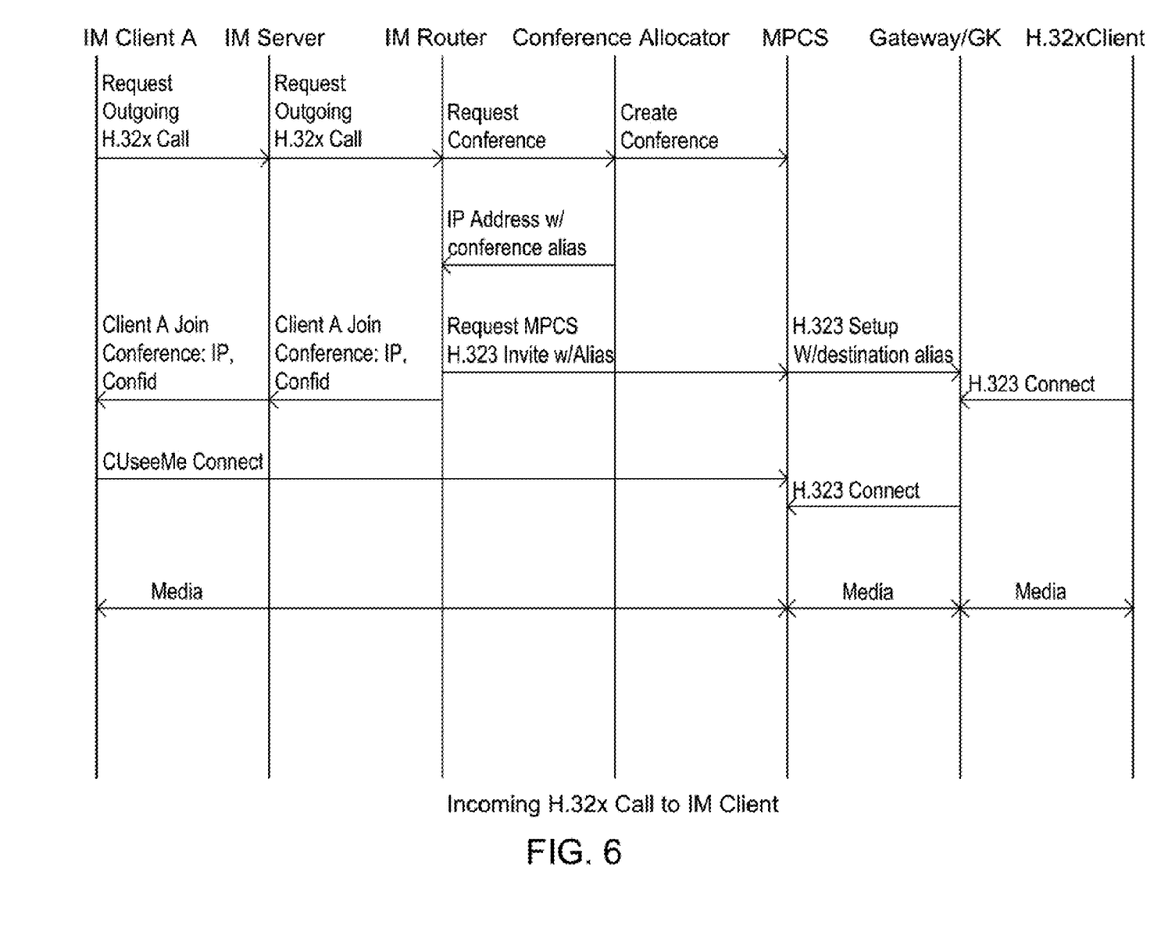
FIG. 6 is a protocol diagram for the scenario in which IM users call H.32x users, in accordance with one embodiment of the invention.

FIG. 6 is a protocol diagram for the scenario in which IM users call H.32x users.

2.4 Conference Registered as a Buddy

In this scenario, the backend components can register with the IM server a buddy or contact which is actually a conference, such that, when an IM endpoint initiates a message to that contact, the IM server can bring it into a video conference without any special software on the desktop, unless it is needed for the actual video conferencing. All the call routing and information is figured out by the backend servers in this case.

The following describes the interaction between the IM client and the IM Server in accordance with the invention. The messages passed between the IM client and the IM server in initiating a video conference in accordance with the invention are described.

1. IM System Components

This section describes the system components in accordance with the invention.

1.1 The IM Client

The IM Client is the software located at the client workstation. From a developer point of view this software has the following (low level) capabilities.

A. Exchange standard IM messages with the IM Server
B. Exchange custom IM messages with the IM Server
C. Establish a connection with the MCU From a user point of view this software has the following (high level) capabilities.

A. All the standard IM features
B. Call another IM Client
C. Call a H323 Client

Examples IM Clients which can be used in connection with the invention include the IPulse application provided by Ericsson and Microsoft Windows XP Messenger. These can be used with the CUseeMe Web toolkit manufactured, sold and licensed by First Virtual Communications, Inc. of Nashua, N.H. and Santa Clara, Calif., which enables them to be audio and video capable. They can also be used with video capabilities included.

1.2 The H323 Client

In one configuration of the system of the invention, the H323 Client is standard H323 software able to establish a connection to another H323 end point via a GateKeeper.

1.3 The H323 Gate Keeper

In one embodiment, the GateKeeper is a standard H323 GateKeeper able to communicate with the IM Server and the MCU.

1.4 The MCU

In one embodiment, the MCU is an 11323 Multipoint Conferencing Unit (MCU) of the type sold by First Virtual Communications, Inc., the assignee of the present application.

1.5 The IM Server

In one embodiment, the IM Server is a piece of server software that is able to handle IM standard messages, some custom messages, and is also able to communicate with the call router and the GateKeeper. The IM Server software can be, for example, the IPulse server and some extension to it. Other examples of IM servers which can be used in connection with the invention include the Microsoft MSN and Exchange Servers.

2. Calling Scenarios

The following tables define the different calling scenarios that are supported by the IM System in accordance with the invention.

TABLE 1

Case 1: The Called party is not Connected.

| IM Caller | IM Server | IM Called Party |
|---|---|---|
| Send a call request to the IM Server | | |
| | Reply that the Callee is not connected | |
| Call terminated | | |

TABLE 2

Case 2: The Called party is connected but refuses the call.

| IM Caller | IM Server | IM Called Party |
|---|---|---|
| Send a call request to the IM Server | | |
| | Forward the call to the IM Called party | |
| | | The Client is ringing The Client rejects the call Tell the IM Server that the call was rejected by the user |
| | Forward the call rejection to the IM Caller | |
| Call terminated | | |

TABLE 3

Case 3: The Called party is connected and accepts the call.

| IM Caller | IM Server | IM Called Party |
|---|---|---|
| Send a call request to the IM Server | | |
| | Forward the call to the IM Called | |
| | | The Client is ringing The Client accepts the call Tell the IM Server that the user accepted the call. |
| | Create the conference. Send the conference address to both ends. | |
| Connect to the conference. | | Connect to the conference. |

TABLE 4

Case 4: The Caller cancels the call while it rings.

| IM Caller | IM Server | IM Called |
|---|---|---|
| Send a call request to the IM Server | | |

TABLE 4-continued

Case 4: The Caller cancels the call while it rings.

| IM Caller | IM Server | IM Called |
|---|---|---|
| | Forward the call to the IM Called | |
| | | The Client is ringing |
| The Client tells the IM server that the user cancelled the call | | |
| | Forward the cancellation to the client. | |
| | | Call Terminated. |

Parameters used in communication between the IM Caller (IM Client) and IM Server include the following.

iConference: ConfAddress

The iConference parameter contains the address of the conference the IM Client should connect to. The ConfAddress contains an IP address and an MPCS conference ID.

iSettings: ConfSettings

The iSettings parameter contains the parameters the IM Client should use to connect to the conference. A typical setting indicates the ability or inability of the client to send video.

3. Messages

This section describes messages sent by the Client to the Server.

3.1 Create Call

This message is sent by the caller client to the server when it wants to start a call. This is the only synchronous message, all other messages are asynchronous an do not return anything.

Parameters:

iAddress: URL

The iAddress parameter contains the address of the other end point to call.

Reply:

oError: Integer

The oError return value contains the error code of the request.

Possible error codes are:

ERR_NO_ERROR

The Call was successfully created.

ERR_NOT_ALLOWED

The IM Client is not allowed to create a call.

ERR_BAD_ADDRESS

The IM Server does not recognize the address.

oCallRef: Call Reference

If the call was successfully created, oCallRef contains the address of the other end point to call. This reference is used by all other messages and remains valid until the call is terminated.

3.2 Incoming Call

This message is sent by the server to the called client after a call was created.

Parameters:

iCallRef: Call Reference

The iCallRef parameter contains the unique reference to the call.

iCaller: URL (Optional)

The iCaller parameter contains the address of the caller client.

3.3 Terminated Call

This message is sent by any client to the server when it cancels a pending call. The server also forwards this message to the other client. The Server itself can decide to send this message on its own. After this message the Call Reference is no longer valid The IM call router will now be described in detail. The purpose of the IM Call Router is to let standard video conferencing clients, such as H.323, SIP, and CUseeMe protocol (manufactured, sold and licensed by First Virtual Communications, Inc., the present assignee) clients, call IM clients via a conference call hosted on a video conferencing server such as an MCU.

1. Architecture

The IM call router supports multiple IM systems and multiple video conferencing systems. In order to achieve this goal the IM call router has an extensible architecture that supports plugins.

The following sections describe the different types of plugins supported by the IM call router.

1.1 The Call Redirector Plugin

The call redirector plugin provides an interface for video conferencing systems. It tells the IM call router that a call occurred, and then forwards the call status returned by the router to the video conferencing client. An IM call router may use multiple call redirector plugins simultaneously. The IM redirector plugin can be compatible with H323, SIP or CUseeMe protocols.

1.2 The IM Plugin

The IM plugin provides an interface for IM systems. It forwards the call received from the call redirector to the IM client, then returns the call status returned by the IM client to the IM call router. An IM call router may use multiple IM plugins simultaneously. The IM plugin can be Microsoft Windows Messenger IM, Ipulse, ICQ or AIM.

1.3 The Conference Allocator Plugin

The conference allocator plugin creates a video conference on the video conference server (MCU) that will host the IM client/video conferencing client session. An IM call router uses only one allocator plugin.

In one embodiment, the conference allocator may open a telnet connection with a video conferencing server. In another embodiment, the conference allocator performs load balancing, using a cloud of video conferencing servers.

2. Plugins, APIs and Callbacks

This section describes the APIs and callbacks that are implemented by the plugins. Because the IM call router may handle a lot of simultaneous calls, because it is time critical, and because some APIs may require user interaction, all the APIs are asynchronous, and none of them requires a reply.

2.1 Call Redirector IM Router Messages This section describes messages sent by the call redirector plugin to the IM router.

2.1.1 CallStarted

This message is sent by the call redirector when it receives a call. The call is then maintained in "ringing" mode until the IM router accepts or rejects the call.

Parameters:

iCallRef: String

The iCallRef parameter is a string that contains a unique reference to the call. This reference is used by all the other messages and remains valid until the call is terminated.

iAddress: IMAddress

The iAddress parameter contains the address of the IM client. The IMAddress type is a string.

2.1.2 CallCanceled

This message is sent by the plugin when the video conferencing client cancels a pending call.

Parameters:

iCallRef: String

The iCallRef parameter contains the unique reference to the call. This reference is the same as the one passed to the CallStarted message.

2.2 IM Router to Call Redirector Messages

This section describes messages sent by the IM router to the call redirector plugin.

2.2.1 CallRejected

This message is sent by the IM router in response to a CallStarted message when the call cannot be issued. This message terminates the call process, then the call reference is no longer valid.

Parameters:

iCallRef: String

The iCallRef parameter contains the unique reference to the call. This reference is the same as the one passed to the CallStarted message.

iError: Integer

The iError parameter contains the reason why the call was rejected. Possible error codes are:

ERR_NOT_VALID

The iAddress parameter passed to the CallStart message is not recognized by any IM plugin.

ERR_NOT_FOUND

The IM Client described in the iAddress parameter passed to the CallStart message was not found.

ERR_NOT_CONNECTED

The IM Client is offline.

ERR_BUSY

The IM Client is busy.

ERR_REJECTED

The IM Client refused the call.

ERR_TIMEOUT

The IM Client did not answer the call.

2.2.2 CallAccepted

This message is sent by the IM router in response to a CallStart message when the call is accepted.
Parameters:
iCallRef: String The iCallRef parameter contains the unique reference to the call. This reference is the same as the one passed to the CallStarted message.
iConfIP: String The iConfIP parameter contains the IP address of the video conferencing server (MCU) that will host the conference.
iConfID: Integer The iConfID parameter contains the ID of the conference.

2.3 IM Router To IM Plugin Messages

This section describes messages sent by the IM router to the IM plugin.

2.3.1 CallStarted

This message is sent by the IM router when in receives an incoming call notification from the call redirector. When receiving this message, the IM plugin resolves the IM client address, checks if the IM Client exists and is connected, and, if so, forwards the call request to the IM client, which will then pop up an "Incoming Call" dialog.
Parameters:
iCallRef: Interger The iCallRef parameter contains a unique reference to the call. This reference is used by all the other messages and remains valid until the call is terminated.
iAddress: IMAddress The iAddress parameter contains the address of the IM client. The IMAddress type is a string.

2.3.2 CallCanceled

This message is sent by the IM router when it receives a call cancelled notification from the call redirector. The IM plugin then forwards this notification to the IM client which will close the "Incoming Call" Dialog.
Parameters:
iCallRef: Integer The iCallRef parameter contains the unique reference to the call. This reference is the same as the one passed to the CallStarted message.

2.4.1 IM Plugin to IM Router Messages

This section describes messages sent by the IM plugin to the IM router.

2.4.1 CallRejected

This message is sent by the IM plugin in response to a CallStarted message when the call cannot be issued. This message terminates the call process, then the call reference is no longer valid.
Parameters:
iCallRef: Integer The iCallRef parameter contains the unique reference to the call. This reference is the same as the one passed to the CallStarted message.
iError: Integer The iError parameter contains the reason why the call was rejected. Possible error codes are:
ERR_NOT_VALID The iAddress parameter passed to the CallStart message is not recognized by any IM plugin When the IM router receives this error code it attempts to use another IM plugin to resolve the address. If all the available IM plugins return this error code, the error is forwarded to the Call Redirector.
ERR_NOT_FOUND The IM Client described in the iAddress parameter passed to the CallStart message was not found.
ERR_NOT_CONNECTED The IM Client is offline.
ERR_BUSY The IM Client is busy.
ERR_REJECTED The IM Client refused the call.
ERR_TIMEOUT The IM Client didn't answer the call.

2.4.2 CallAccepted

This message is sent by the IM plugin in response to a CallStart message when the call is accepted. When the IM router receives this call it asks the conference allocator to create a conference then forwards the acceptance to the call redirector with the newly created conference address.
Parameters:
iCallRef Integer The iCallRef parameter contains the unique reference to the call. This reference is the same as the one passed to the CallStarted message.

2.5 IM Router To Conference Allocator Messages

This section describes the message sent by the IM router to the conference allocator.

2.5.1 CreateConf

This message is sent by the IM router when the IM client accepted an incoming call.
Parameters:
iRequestRef: Integer The iRequestRef parameter is a unique reference that will help the IM router to identify (Alf, Please Complete this Sentence.)
iConfSettings: ConfSettings The iConfSettings parameter contains information about the conference.

2.6 Conference Allocator to IM Router Messages

This section describes messages sent by the conference allocator to the IM router.

2.6.1 ConfCreated

This message is sent by the conference allocator to tell the IM router that the conference was successfully created.
Parameters:
iRequestRef: Integer The iRequestRef parameter is the unique request reference. This reference is the same as the one passed to the CreateConf message.
iConfIP String The iConfIP parameter contains the IP address of the video conferencing server (MCU) that will host the conference.
iConfID: Integer The iConfID parameter contains the ID of the conference.

2.6.2 Failed

This message is sent by the conference allocator to tell the IM router that it was not able to create a conference.
Parameters:
iRequestRef: Integer The iRequestRef parameter is the unique request reference. This reference is the same as the one passed to the CreateConf message.
iError: Integer The iError parameter contains the ID of error that prevent the conference allocator to create the conference.

The IM plugin for IM systems in accordance with embodiments of the invention will now be described in detail. The plugin in accordance with the invention allows IM users to add video/audio capabilities to their IM client. It not only uses the user status and location features of IM systems, but it also works together with the IM service.

The IM plugin is composed of two distinct conceptual modules even if both can fit into one executable. The backend application manages the low-level layer of the IM protocol and IM plugin user interface on the IM application's user interface. The conference room application uses CUseeMe Web technology, manufactured, sold and licensed by First Virtual Communications, Inc., the present assignee, to display the video window.

The IM plugin in accordance with the invention is normally launched at system startup and runs in the background as an invisible application. A tray icon may be provided when the IM application is online if needed.

In accordance with the invention, there are two approaches to integrating the plugin of the invention with a third party IM application. The first involves using a local proxy to monitor any IM protocol messages as well as send custom/private messages used for conference rendezvous information, when no APIs are provided by the IM application vendor. The second involves using the vendor-supplied APIs to monitor IM events and messages as well as send custom/private messages for conference rendezvous information. These may be done at either caller and/or callee, or only at the sever to invite endpoints like Windows XP Messenger, which has a rendezvous protocol embedded. These two approaches are now described in detail.

1. The Proxy

During installation, the proxy is inserted between the client and the IM server. The IM plugin of the invention changes the IM application's connection settings to use a port on the local machine, where the proxy is listening. A solution with a real Socks proxy can also be implemented, changing the IM application's proxy settings instead of the IM server address itself.

The proxy decodes the IM protocol. It is able to retrieve information on the buddies like IM ID, IP address, and status. IM data is forwarded to the IM server/IM client.

Figure 7:
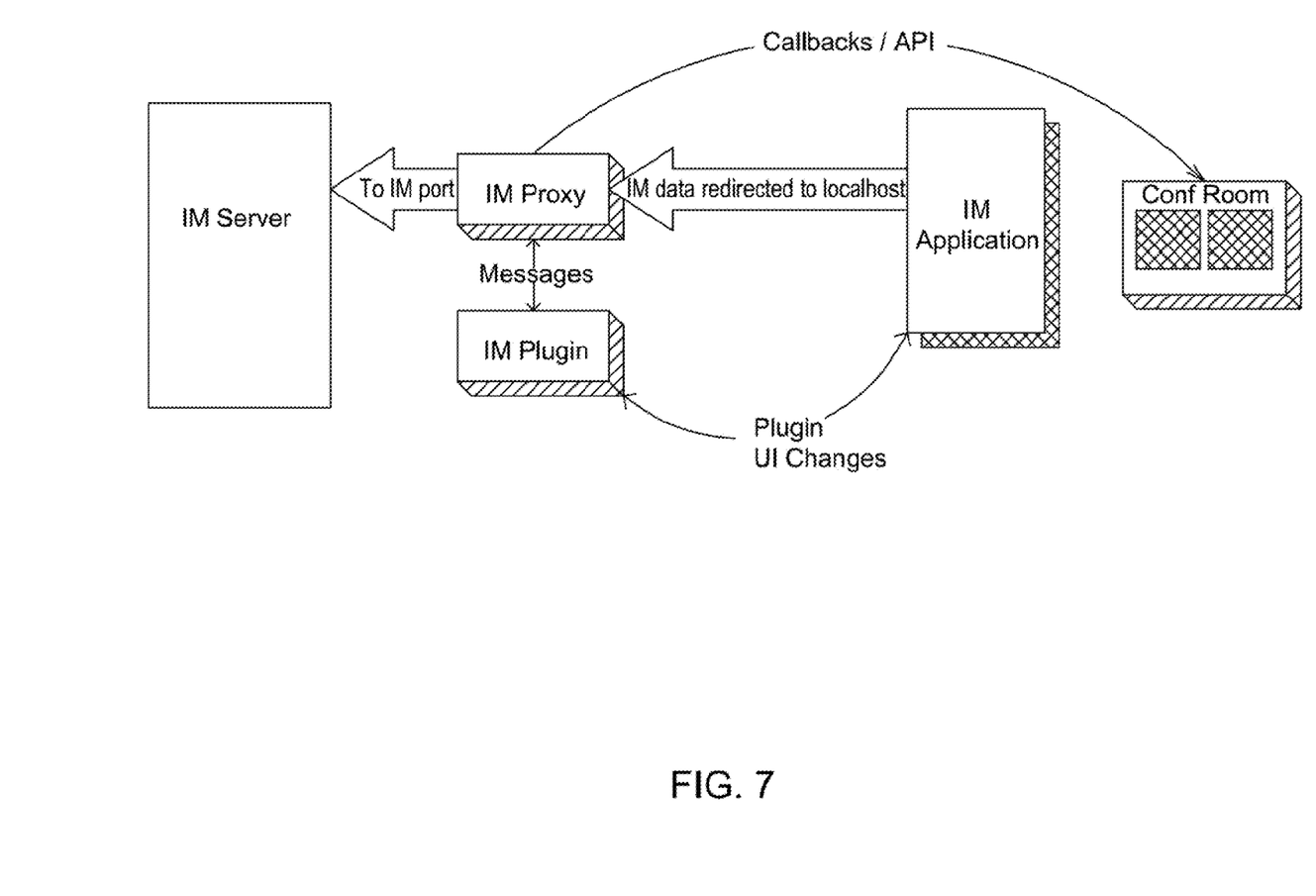
FIG. 7 contains a functional block diagram of the operation of the invention with an IM client, in accordance with one embodiment of the invention.

FIG. 7 contains a functional block diagram of the operation of the invention with an existing third-party client. Incoming messages from other buddies are inspected and sometimes trapped in case of plugin-specific messages. Those messages can pass through the server, or come from a direct TCP connection with the buddies. Outgoing messages are intercepted as well, allowing introduction of custom information inside the messages, which are then forwarded to the IM server.

The plugin module is responsible for the integration of custom controls inside the third party IM application's user interface that let the user start video connections. A click on the video button can trigger, for example, a CUseeMe Web invitation to the remote chatter. Windows hooks are installed in the IM applications in order to receive video buttons events as well as hooks on windows creations to check which IM or chat window is visible.

The conference room in which the video conference takes place may or may not be an independent window, and by default it does not stick to the IM windows. The video is an autonomous communication tool, like chat or IM. Shortcuts are provided from within the IM window or the IM plugin UT, but if the IM window is closed, the video conference may persist.

Two different layouts are provided, and a setting allows the user to switch between the layouts. The ConfRoom is a singleton resource, as long as a video conference is in progress, all the video shortcuts in all the IM windows are grayed. An option allows the user to stick its video if that mode is preferred. CUseeMe for Pulse is an example of this kind of integration and an example of configurable layout.

Figure 8:
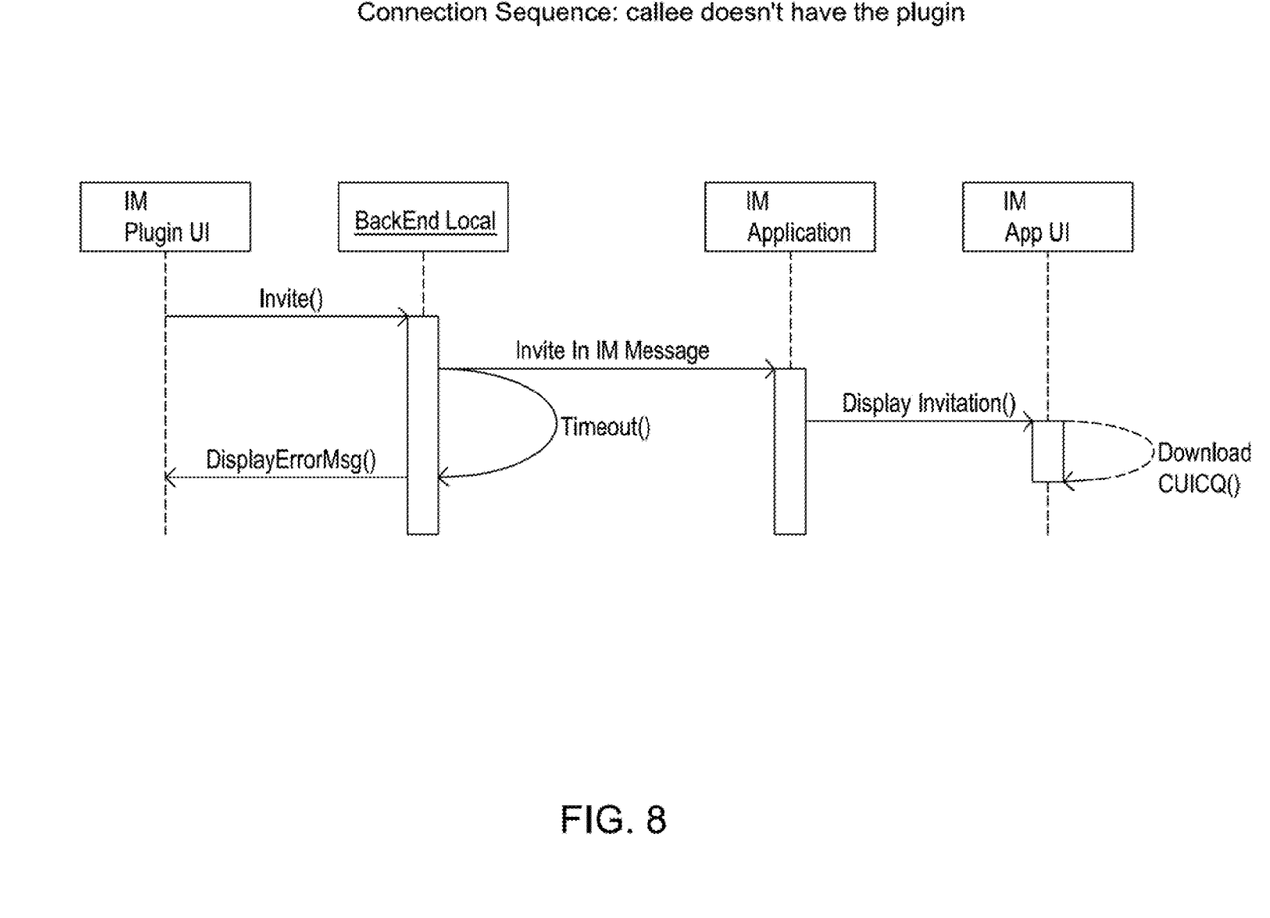
FIG. 8 illustrates the event sequence between an IM client and a remote buddy who does not have the plugin, in accordance with one embodiment of the invention.

FIG. 8 illustrates the event sequence between the IM plugin in accordance with the invention and a remote buddy who does not have the plugin. Back-end Local represents the interception of the IM protocol. The user interface on the local side contains the plugin buttons, IM client is the remote IM client and remote IM UT is the IM application's IM window. If the plugin download and installation are fast enough, the callee might call back the caller before the timeout.

Figure 9:
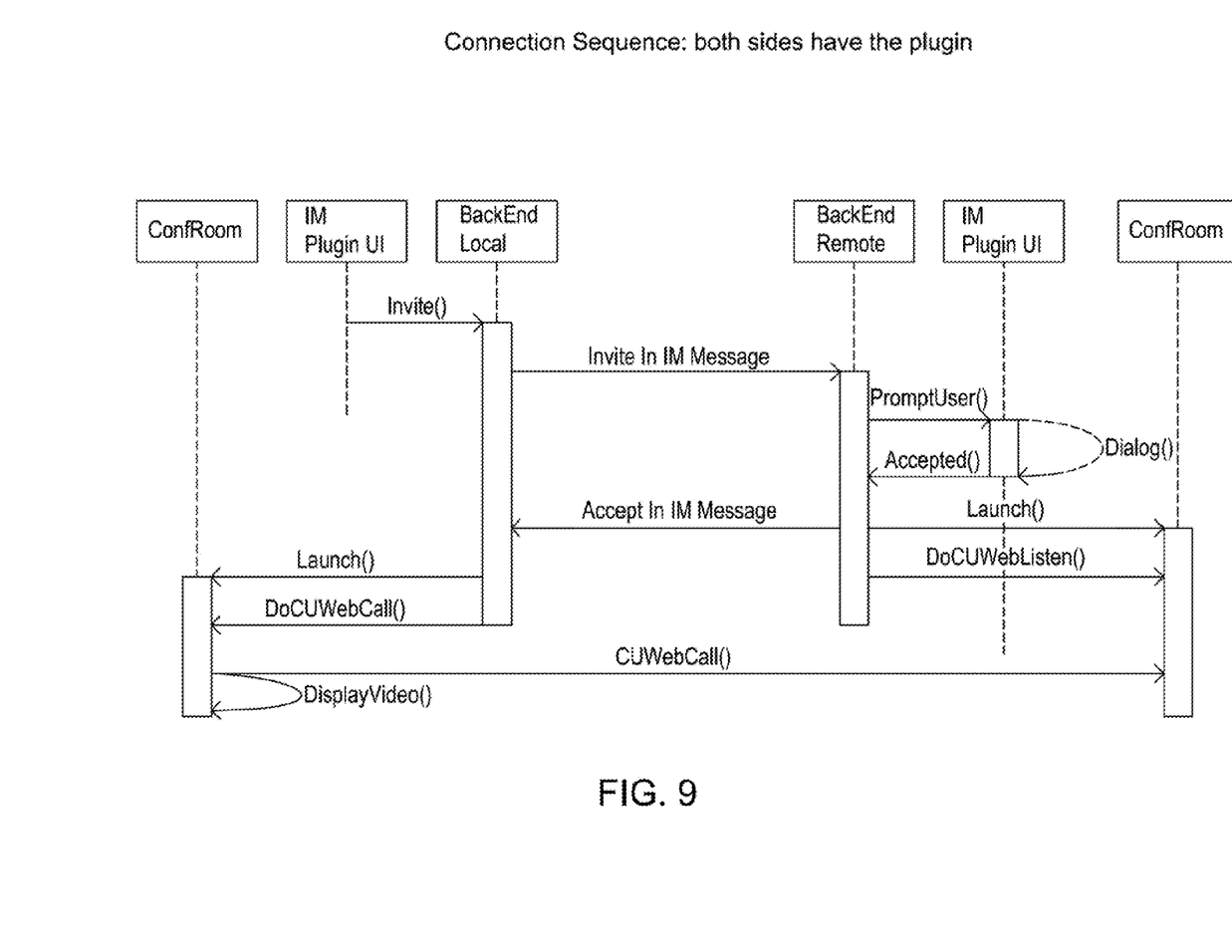
FIG. 9 illustrates the event sequence between two plugins, in accordance with one embodiment of the invention.

FIG. 9 illustrates the event sequence between two plugins. Back-end Local and Back-end remote represent the interception of the IM protocol. Im plugin UT on both sides contains the plugin buttons.

2. Application APIs

Figure 10:
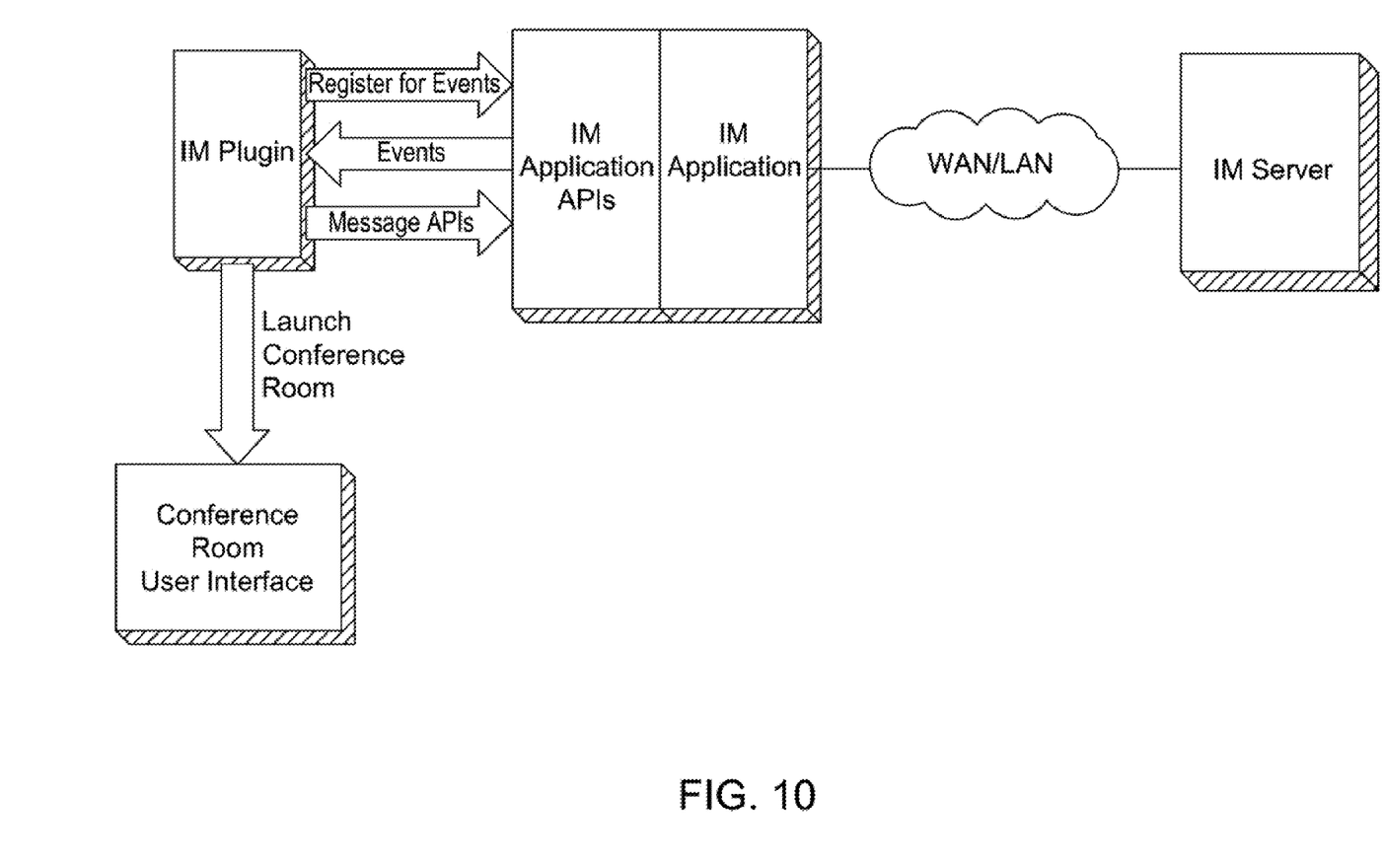
FIG. 10 contains a schematic functional block diagram of integrating the plugin of the invention with an IM application using vendor APIs.

This approach operates in an analogous fashion to the proxy and plugin described above. But, instead of intercepting messages with a proxy, the vendor has supplied APIs for a clean integration into its IM product. The plugin of the invention can register for events and query presence information of buddies in the list. The plugin can also create new message channels for communicating conference rendezvous information between endpoints, as well as intercept messages upon receipt. In addition, the application may also provide APIs such that the plugin of the invention can add menu choices and/or buttons to the IM application's user interface. Otherwise, the actual message content, sequence and parameters are the same as those used in the proxy approach. FIG. 10 is a schematic block diagram illustrating the API approach.

While this invention has been particularly shown and described with references to preferred embodiments thereof, it will be understood by those skilled in the art that various changes in form and details may be made herein without departing from the spirit and scope of the invention as defined by the following claims.

The invention claimed is:

1. A system for initiating video conferences between a plurality of nodes, the system comprising:
    a processor, including a memory, that initiates a video conference from an instant message request, wherein an instant messaging server supports instant messaging between the plurality of nodes, wherein a conference server supports video conferencing between the plurality of nodes, and wherein the processor is configured to:
        receive, from the instant messaging server, the instant message request created by an instant messaging utility on a first node, wherein the instant message request invites a second node, to the video conference;
        in response to detecting the instant message request, extract presence information for the first node and the second node from the instant message request, wherein the extracted presence information identifies a capability to receive instant messages in an instant messaging list and includes a communication mode associated with each of the first node and the second node;
        initiate the video conference by transmitting the extracted presence information to the conference server that supports the video conference; and
        communicate, using the instant messaging server, to the second node an instant message to join the video conference, wherein the communication mode is embedded in the instant message such that the video conference is set up between the first node and at least the second node through the conference server using the communication mode.

2. The system of claim 1, wherein the first node and the second node participate in the video conference via at least one of: a public switched telephone network (PSTN), an internet protocol (IP) network, an Ethernet network, cellular communication, a computer, a network gateway, a video conferencing standard protocol, an ISDN standard protocol, and an ATM standard protocol.

3. The system of claim 1, further comprising a database for storing information related to the first node and the second node, wherein the information stored in the database is related to the communication mode of each of the first node and the second node participating in the video conference.

4. The system of claim 1, further comprising providing a presence indicator for the video conference in the instant messaging list.

5. A method for initiating video conferences between a plurality of nodes, wherein an instant messaging server supports instant messaging between the plurality of nodes and a conference server for supporting video conferencing between the plurality of nodes, the method comprising:
  initiating a video conference on the conference server between a plurality of client nodes using an instant message request transmitted over the instant messaging server, wherein the initiating further comprises:
    receiving, from the instant messaging server, the instant message request created by an instant messaging utility on a first node, wherein the instant message request invites a second node, to the video conference;
    in response to detecting the instant message request, extracting presence information for the first node and the second node from the instant message request, wherein the extracted presence information identifies a capability to receive instant messages in an instant messaging list and includes a communication mode associated with each of the first node and the second node;
    initiating the video conference by transmitting extracted presence information to the conference server that supports the video conference; and
    communicating, using the instant messaging server, to the second node an instant message to join the video conference, wherein the communication mode is embedded in the instant message such that the video conference is set up between the first node and at least the second node through the conference server using the communication mode.

6. The method of claim 5, wherein the first node and the second node participate in the video conference via at least one of: a public switched telephone network (PSTN), an internet protocol (IP) network, an Ethernet network, cellular communication, a computer, a network gateway, a video conferencing standard protocol, an ISDN standard protocol, and an ATM standard protocol.

7. The method of claim 5, further comprising storing information related to the first node and the second node in a database, wherein the information stored in the database is related to the communication mode of each of the first node and the second node participating in the video conference.

8. The method of claim 5, further comprising providing a presence indicator for the video conference in the instant messaging list.

9. A non-transitory computer-readable storage medium containing computer-executable instructions that, when executed by a processor, cause the processor to perform a method for initiating video conference, the method comprising:
  initiating a video conference on a conference server between a plurality of client nodes using an instant message request transmitted over an instant messaging server, wherein the instant messaging server supports instant messaging between the plurality of nodes and the conference server for supporting video conferencing between the plurality of nodes, and wherein the initiating further comprises:
    receiving, from the instant messaging server, the instant message request created by an instant messaging utility on a first node, wherein the instant message request invites from a first node to a second node to the video conference;
    in response to detecting the instant message request, extracting presence information for the first node and the second node from the instant message request, wherein the extracted presence information identifies a capability to receive instant messages in an instant messaging list and includes a communication mode associated with each of the first node and the second node;
    initiating the video conference by transmitting the extracted presence information to the conference server that supports the video conference; and
    communicating, using the instant messaging server, to the second node an instant message to join the video conference, wherein the communication mode is embedded in the instant message such that the video conference is set up between the first node and at least the second node through the conference server using the communication mode.

10. The non-transitory computer-readable storage medium of claim 9, wherein the first node and the second node participate in the video conference via at least one of: a public switched telephone network (PSTN), cellular communication, a computer, a network gateway, a video conferencing standard protocol, an ISDN standard protocol, and an ATM standard protocol.

11. The non-transitory computer-readable storage medium of claim 9, wherein the method further comprises storing information related to the first node and the second node in a database, wherein the information stored in the database is related to the communication mode of each of the first node and the second node participating in the video conference.

12. The non-transitory computer-readable storage medium of claim 9, wherein the method further comprises providing a presence indicator for the video conference in the instant messaging list.

* * * * *